United States Patent
Hu

(10) Patent No.: US 10,489,879 B2
(45) Date of Patent: Nov. 26, 2019

(54) IMAGE PROCESSING CHIP AND IMAGE PROCESSING SYSTEM

(71) Applicant: Altek Semiconductor Corp., Hsinchu (TW)

(72) Inventor: Chao-Yu Hu, Miaoli County (TW)

(73) Assignee: Altek Semiconductor Corp., Hsinchu (TW)

( * ) Notice: Subject to any disclaimer, the term of this patent is extended or adjusted under 35 U.S.C. 154(b) by 115 days.

(21) Appl. No.: 15/690,291

(22) Filed: Aug. 30, 2017

(65) Prior Publication Data

US 2019/0035048 A1    Jan. 31, 2019

(30) Foreign Application Priority Data

Jul. 26, 2017 (TW) .............................. 106125050 A

(51) Int. Cl.
| | |
|---|---|
| *G06F 15/00* | (2006.01) |
| *G06T 1/20* | (2006.01) |
| *G06T 7/00* | (2017.01) |
| *G06T 7/55* | (2017.01) |

(52) U.S. Cl.
CPC ................. *G06T 1/20* (2013.01); *G06T 7/55* (2017.01); *G06T 7/97* (2017.01); *G06T 2200/28* (2013.01)

(58) Field of Classification Search
CPC .... G06T 1/20; G06T 7/55; G06T 7/97; G06T 2200/28
USPC ......................................................... 358/471
See application file for complete search history.

(56) References Cited

U.S. PATENT DOCUMENTS

| | | | |
|---|---|---|---|
| 2005/0007373 A1 | 1/2005 | Lim | |
| 2011/0157395 A1* | 6/2011 | Compton | ............... H04N 5/335 348/222.1 |
| 2013/0235226 A1* | 9/2013 | Karn | .................. H04N 5/23241 348/220.1 |
| 2015/0091916 A1 | 4/2015 | Park et al. | |
| 2016/0227160 A1 | 8/2016 | Baek et al. | |

FOREIGN PATENT DOCUMENTS

| | | |
|---|---|---|
| CN | 100471156 | 3/2009 |
| CN | 103841315 | 6/2014 |
| TW | 201401848 | 1/2014 |
| TW | 201635795 | 10/2016 |
| TW | I554095 | 10/2016 |

OTHER PUBLICATIONS

"Office Action of Taiwan Counterpart Application", dated Feb. 9, 2018, p. 1-p. 9, in which the listed references were cited.

* cited by examiner

*Primary Examiner* — Mark R Milia
(74) *Attorney, Agent, or Firm* — JCIPRNET

(57) ABSTRACT

An image processing chip and an image processing system are provided. The image processing chip includes a first image end, a second image end, an image processing block and a multiplexer. The first image end receives at least one first image data packet. The image processing block is used to convert the at least one first image data packet into at least one second image data packet. The multiplexer has a first input end coupled to the first image end, a second input end coupled to the image processing block, and an output end coupled to the second image end. When the image processing chip operates in a first mode, the multiplexer is coupled to the first input end and the output end to transmit the at least one first image data packet from the first image end to the second image through the multiplexer.

8 Claims, 3 Drawing Sheets

IMAGE PROCESSING CHIP AND IMAGE PROCESSING SYSTEM

CROSS-REFERENCE TO RELATED APPLICATION

This application claims the priority benefit of Taiwan application serial no. 106125050, filed on Jul. 26, 2017. The entirety of the above-mentioned patent application is hereby incorporated by reference herein and made a part of this specification.

BACKGROUND OF THE INVENTION

1. Field of the Invention

The invention relates to an image processing chip and an image processing system, and particularly relates to an image processing chip and an image processing system having a serial packet transmission interface.

2. Description of Related Art

In the conventional related art, a high speed transmission interface transmitting with serial packets has the advantages of having a high transmission rate and a less transmission pin count. In order to enhance the reliability of data transmission, a differential signal may be further used for transmission so as to mitigate the influence caused by the electromagnetic interference (EMI). Besides, in some image processing systems, an additional image processing chip is often required to enhance the image quality or carry out additional image processing on the original image, such as noise suppression or depth calculation. However, in some scenarios, the image processing chip is not required to carry out image processing but is only required to transmit the received original image to another processing chip.

In order to transmit original image data to another processing chip, it is common to add a bypass between an input end and an output end of an image processing engine in the image processing chip. Accordingly, the original image data may bypass the image processing engine without being modified. However, under such circumstance, a transmission interface controller of the image processing chip is still supplied with power and remains turned on in order to packetize and depacketize the original image data transmitted through the serial packet transmission interface.

SUMMARY OF THE INVENTION

The invention provides an image processing chip and an image processing system capable of providing a signal bypass in the image processing chip at a low cost.

The image processing chip according to an embodiment of the invention includes a first image end, a second image end, an image processing block and a multiplexer. The first image end receives at least one first image data packet. The image processing block is coupled to the first image end and adapted to convert the at least one first image data packet into at least one second image data packet. The multiplexer has a first input end coupled to the first image end, a second input end coupled to the image processing block, and an output end coupled to the second image end. When operating in a first mode, the multiplexer is coupled to the first input end and the output end to transmit the at least one first image data packet from the first image end to the second image end through the multiplexer. When operating in a second mode, the multiplexer is coupled to the second input end and the output end to transmit the at least one second image data packet from the image processing block to the second image end through the multiplexer.

An image processing system according to an embodiment of the invention includes an image sensor, an application processor, and an image processing chip. The image sensor outputs at least one first image data packet according to an interface transmission protocol. The application processor outputs a control command. The image processing chip is coupled between the image sensor and the application processor, and includes a first image end, a second image end, an image processing block, and a multiplexer. The first image end is coupled to the image sensor to receive the at least one first image data packet. The second image end is coupled to the application processor. The image processing block is coupled to the first image end and adapted to convert the at least one first image data packet into at least one second image data packet. The multiplexer has a first input end coupled to the first image end, a second input end coupled to the image processing block, and an output end coupled to the second image end. When the image processing chip operates in a first mode in response to the control command, the multiplexer is coupled to the first input end and the output end to transmit the at least one first image data packet from the first image end to the second image end through the multiplexer. When the image processing chip operates in a second mode in response to the control command, the multiplexer is coupled to the second input end and the output end to transmit the at least one second image data packet from the image processing block to the second image end through the multiplexer.

Based on the above, regarding the image processing chip and the image processing system according to the embodiments of the invention, the bypass across the whole image processing block is enabled with a single multiplexer in the image processing chip according to the embodiments of the invention. In other words, a signal bypass in the image processing chip is enabled by only slightly increasing the manufacturing cost and the circuit board area.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
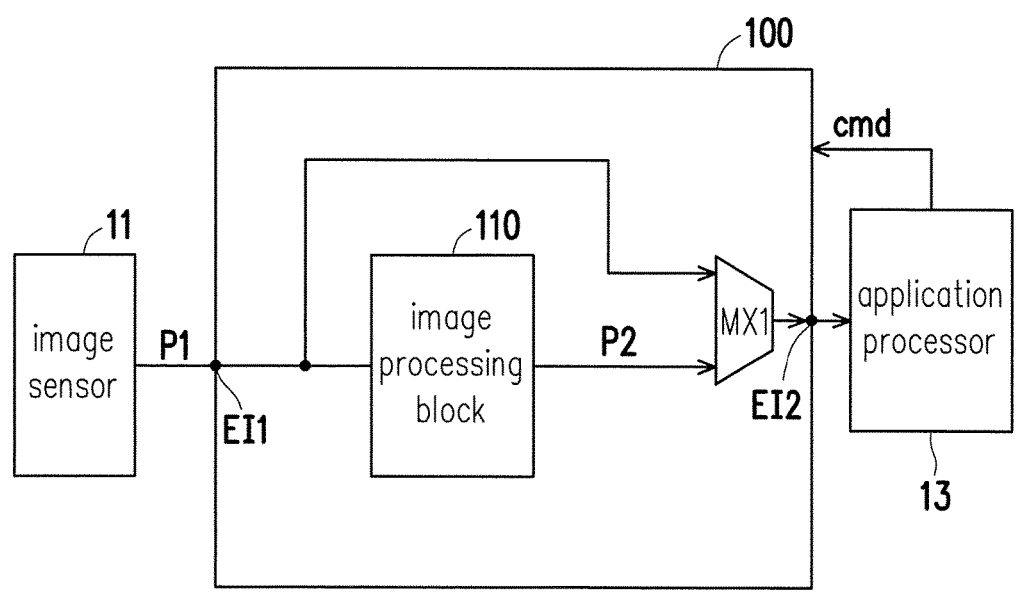
FIG. 1 is a schematic view illustrating an image processing system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view illustrating an image processing system according to an embodiment of the invention. Referring to FIG. 1, in the embodiment, an image processing system 10 includes an image sensor 11, an application processor 13, and an image processing chip 100, such as image signal processor (ISP). The image processing chip 100 is coupled to the image sensor 11 and the application processor 13, and includes an image processing block 110, a multiplexer MX1, a first image end EI1, and a second image end EI2.

The image processing chip 100 is coupled to the image sensor 11 to receive at least one first image data packet P1 provided by the image sensor 11. The image processing chip 100 is coupled to the application processor 13 to provide the at least one first image data packet P1 or at least one second image data packet P2 to the application processor 13 and receive a control command cmd provided by the application processor 13, so as to correspondingly operate in a first mode or a second mode.

A first image end EI1 is coupled to the image sensor 11 to receive the at least one first image data packet P1 provided by the image sensor 11. The image processing block 110 is coupled to the first image end EI1 to receive the at least one first image data packet P1 through the first image end EI1 and convert the at least one first image data packet P1 into at least one second image data packet P2. A first input end of the multiplexer MX1 is coupled to the first image end EI1 to receive the at least one first image data packet P1. A second input end of the multiplexer MX1 is coupled to the image processing block 110 to receive the at least one second image data packet P2. In addition, an output end of the multiplexer MX1 is coupled to the second image end EI2. The second image end EI2 is coupled to the application processor 13 to provide the at least one first image data packet P1 or the at least one second image data packet P2 to the application processor 13.

When the image processing chip 100 operates in the first mode, the multiplexer MX1 is coupled to the first input end and the output end. In other words, the first image end EI1 is directly coupled to the second image end EI2 through the multiplexer MX1. Accordingly, the at least one first image data packet P1 is directly transmitted from the first image end EI1 to the second image end EI2 through the multiplexer MX1. In other words, when the image processing chip 100 operates in the first mode, a bypass across the image processing block 110 is provided, and the image processing block 110 is thus not required to be used. In other words, the at least one first image data packet P1 is not processed, and the first mode may be considered as a data bypass mode of the image processing chip 100.

When the image processing chip 100 operates in the second mode, the multiplexer MX1 is coupled to the second input end and the output end. In other words, the first image end EI1 is coupled to the second image end EI2 through the image processing block 110. Accordingly, the image processing block 10 converts the at least one first image data packet P1 into the at least one second image data packet P2, and the at least one second image data packet P2 is transmitted from the image processing block 110 to the second image end EI2 through the multiplexer MX1. In other words, when the image processing chip 100 operates in the second mode, the image processing block 110 may process the at least one first image data packet P1 to generate the at least one second image data packet P2, and the second mode may be considered as a data processing mode of the image processing chip 100.

Based on the above, the image processing chip according to the embodiments of the invention enables the bypass across the whole image processing block with a single multiplexer. In other words, a signal bypass of the image processing chip is enabled by only slightly increasing the manufacturing cost and the circuit board area.

Besides, in the embodiments of the invention, when the image processing chip 100 operates in the first mode, since the image processing block is not required to be turned on, the image processing block 110 may be set in a power down domain. In other words, a power domain where the image processing block 110 is arranged may be set to be a power down domain. When the image processing chip 100 operates in the second mode, since the image processing block needs to be used, the power domain where the image processing block is arranged may be set to be a power up domain. Therefore, when the image processing chip 100 operates in the first mode, only the multiplexer MX1 consumes power, and the power consumption of the image processing chip 100 is thus reduced effectively.

In the embodiment of the invention, the image processing system 10 may be formed by a plurality of electronic devices in a mobile electronic apparatus. Examples of the mobile electronic apparatus include electronic apparatuses having photo-shooting capability, such as smart phones, tablet computers, or digital cameras. The image sensor 11 may include a lens and a light sensor. The light sensor may include a charge coupled device (CCD), a complementary metal-oxide semiconductor (CMOS), or other devices. The image sensor 11 may further include an aperture device, for example. It should be noted that the invention does not intend to impose a limitation on this regard.

The application processor (AP) 13 serves to operate a variety of functions and peripheral devices, such as an image sensor, a display, a memory, or the like. The application processor 13 may be implemented with an integrated circuit (IC) or a system on chip (SoC). However, the invention is not limited thereto. In addition, the image processing chip 100 is a chip having image processing capability, and is capable of receiving and processing external image data. Therefore, the image processing chip 100 is suitable to be disposed in an image capturing apparatus or an image display apparatus. For example, the image processing chip 100 is capable of suppressing noises, calculating a depth, enhancing an image, or the like. It should be noted that the invention does not impose a limitation on this regard. Generally speaking, the image processing chip 100 may be connected with another chip or another electronic apparatus through a variety of transmission interfaces and exchange and transmit image data according to a corresponding interface transmission protocol.

Figure 2:
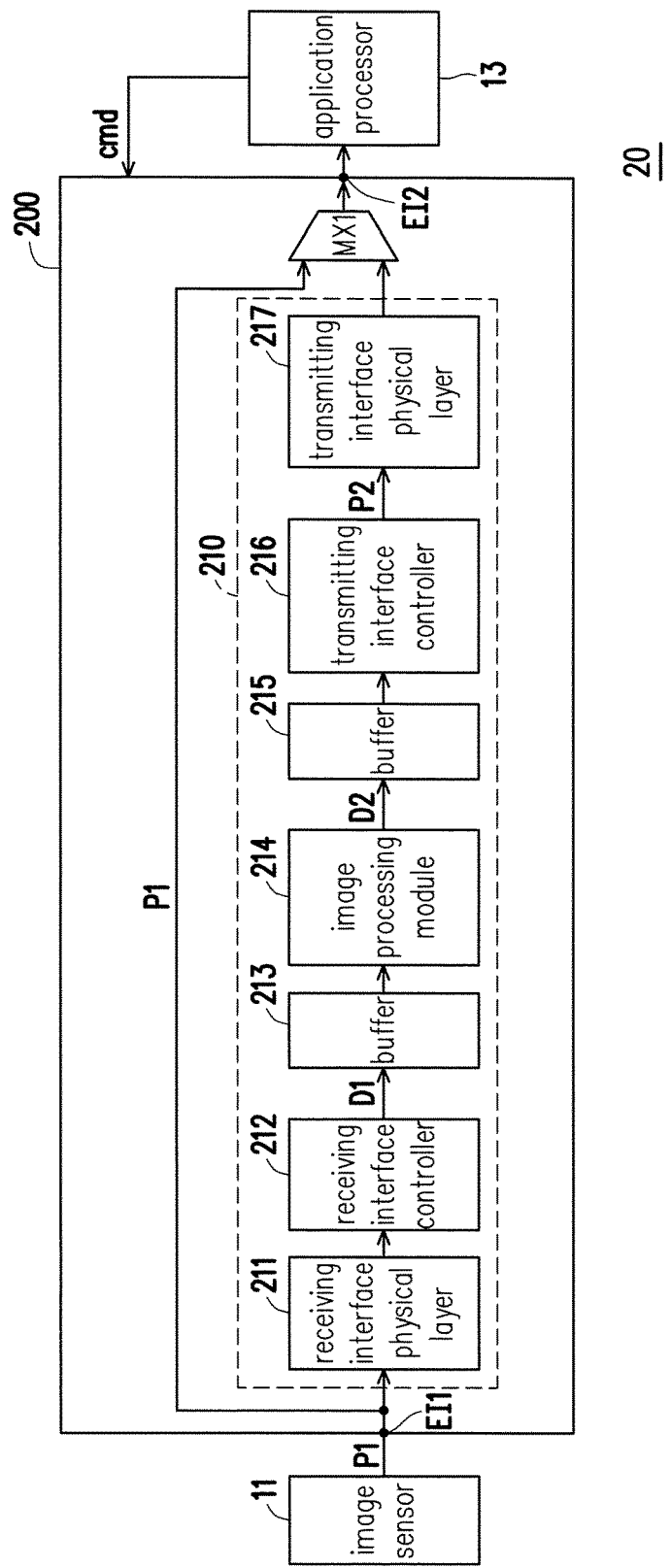
FIG. 2 is a schematic view illustrating an image processing system according to an embodiment of the invention.

FIG. 2 is a schematic view illustrating an image processing system according to an embodiment of the invention. Referring to FIGS. 1 and 2, an image processing system 20 is substantially the same as the image processing system 10. What differs therebetween lies in an image processing block 210 of the image processing chip 200. In the following, an example adopting the mobile industry processor interface (MIPI) protocol as the interface transmission protocol is described. However, the invention is not limited thereto. More specifically, an image sensor 11 outputs the at least one first image data packet P1 to the image processing chip 200 through the MIPI protocol, and the application processor 13 communicates with the image processing chip 200 through a defined MIPI protocol and an MIPI interface.

In the embodiment, the image processing block 210 includes a receiving interface physical layer 211, a receiving interface controller 212, a buffer 213, an image processing module 214, a buffer 215, a transmitting interface controller 216, and a transmitting interface physical layer 217. The receiving interface physical layer 211 is coupled to the first image end EI1 and receives the at least one first image data packet P1 according to the MIPI protocol. The receiving interface controller 212 is coupled to the receiving interface physical layer 211. The buffer 213 is coupled to the receiving interface controller 212. The image processing module 214 is coupled between the buffer 213 and the buffer 215. In other words, the image processing module 214 is coupled between the receiving interface controller 212 and the transmitting interface controller 216. The transmitting interface controller 216 is coupled to the buffer 215. The transmitting interface physical layer 217 is coupled to the transmitting interface controller 216 and also coupled to the second input end of the multiplexer MX1.

When the image processing chip 200 communicates with the image sensor 11 and the application processor 13 based on the MIPI protocol, the receiving interface physical layer 211 and the transmitting interface physical layer 217 may be MIPI D-PHY circuits. The MIPI D-PHY circuit may include a clock lane and at least one data lane. Moreover, an interface between the receiving interface controller 212 and the receiving interface physical layer 211 may serve as a physical protocol interface (PPI) defined in the MIPI protocol, and an interface between the transmitting interface controller 216 and the transmitting interface physical layer 217 may also be a PPI defined in the MIPI protocol.

In the embodiment, when the image processing chip 200 operates in the first mode in response to the control command cmd, the at least one first image data packet P1 is directly transmitted from the first image end EI1 to the second image end EI2 through the multiplexer MX1. When the image processing chip 200 operates in the second mode in response to the control command cmd, the at least one first image data packet P1 undergoes image processing by the image processing block 210.

More specifically, the receiving interface physical layer 211 receives the at least one first image data packet P1 through the first image end EI1. Then, the receiving interface controller 212 receives the at least one first image data packet P1 from the receiving interface physical layer 211 and depacketizes the at least one first image data packet P1 to obtain an original image data D1. In addition, the receiving interface controller 211 may depacketize the at least one first image data packet P1 based on the MIPI protocol, so as to output the original image data D1 to the buffer 213 for temporary storage. Moreover, the buffer 213 may be a line buffer.

The image processing module 214 obtains the original image data D1 from the buffer 213 and performs image processing on the original image data D1 to generate a processed image data D2. In addition, the image processing module 214 may include one or more image processing engines and data pipelines, so as to perform image processing on the original image data D1 and generate the processed image data D2. The image processing module 214 may transmit the processed image data D2 to the buffer 215 for temporary storage. Moreover, the buffer 215 may be a line buffer.

The transmitting interface controller 216 receives the processed image data D2 from the buffer 215 and packetizes the processed image data D2 to generate the at least one second image data packet P2. Accordingly, the transmitting interface physical layer 217 transmits the at least one second image data packet P2 to the application processor 13.

Figure 3:
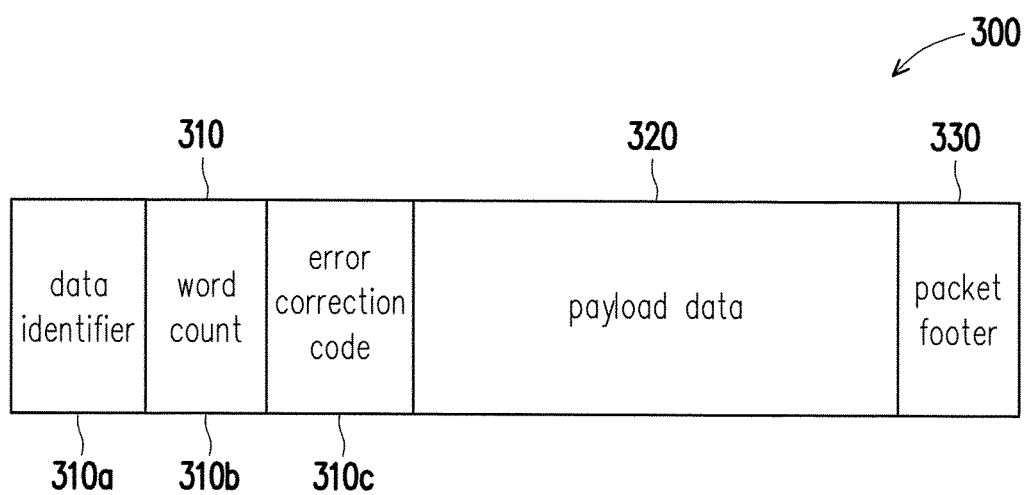
FIG. 3 is a schematic view illustrating a packet format of an image data packet according to an embodiment of the invention.

FIG. 3 is a schematic view illustrating a packet format of an image data packet according to an embodiment of the invention. Referring to FIG. 3, in the embodiment, an image data packet 300 according to the MIPI protocol includes a packet header (PH) 310, a payload data 320, and a packet footer (PF) 330. Therefore, the receiving interface controller 212 may follow a packet format according to the MIPI protocol and depacketize the at least one first image data packet P1, so as to obtain valid data in the at least one first image data packet P1. In addition, the image processing module 214 may perform image processing on the original image data D1. In addition, the packet header 310 includes a packet field 310a, a packet field 310b, and a packet field 310c. The packet field 310a stores a data identifier (DI) of the image data packet 300, the packet field 310b stores a word count (WC) of the image data packet 300, and the packet field 310c stores an error correction code (ECC) of the image data packet 300. Similarly, the transmitting interface controller 216 may follow the packet forma according to the MIPI protocol and packetize the processed image data D2, so as to generate the at least one second image data packet P2. It should be noted that the example of FIG. 3 and the modified data identifier are only described herein for an illustrative purpose, and shall not be construed as limitations on the invention.

In view of the foregoing, regarding the image processing chip and the image processing system according to the embodiments of the invention, the bypass across the whole image processing block is enabled with a single multiplexer in the image processing chip according to the embodiments of the invention. In other words, the signal bypass in the image processing chip is enabled by only slightly increasing the manufacturing cost and the circuit board area. Besides, when the image processing chip operates in the first mode, since the image processing block is not required to be turned on, the image processing block may be set in a power down domain. In other words, the power domain where the image processing block is arranged may be set to be a power down domain. Therefore, when the image processing chip operates in the first mode, only the multiplexer consumes power, and the power consumption of the image processing chip is thus reduced effectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing chip, comprising:
 a first image end, receiving at least one first image data packet;
 a second image end;
 an image processing block, coupled to the first image end and adapted to convert the at least one first image data packet into at least one second image data packet; and
 a multiplexer, having a first input end coupled to the first image end, a second input end coupled to the image processing block, and an output end coupled to the second image end,
 wherein the image processing block comprises:
 a receiving interface physical layer, coupled to the first image end and receiving the at least one first image data packet according to an interface transmission protocol;
 a receiving interface controller, coupled to the receiving interface physical layer;

a transmitting interface physical layer, coupled to the second input end of the multiplexer;

a transmitting interface controller, coupled to the transmitting interface physical layer; and an image processing module, coupled between the receiving interface controller and the transmitting interface controller, wherein when the image processing chip operates in a first mode, the multiplexer is coupled to the first input end and the output end to transmit the at least one first image data packet from the first image end to the second image end through the multiplexer, and when the image processing chip operates in a second mode, the multiplexer is coupled to the second input end and the output end to transmit the at least one second image data packet from the image processing block to the second image end through the multiplexer, wherein when the image processing chip operates in the second mode, the receiving interface controller receives the at least one first image data packet from the receiving interface physical layer and depacketizes the at least one first image data packet to obtain original image data, the image processing module performs image processing on the original image data to generate processed image data, and the transmitting interface controller receives and packetizes the processed image data to generate the at least one second image data packet, such that the transmitting interface physical layer transmits the at least one second image data packet according to the interface transmission protocol.

2. The image processing chip as claimed in claim 1, wherein when the image processing chip operates in the first mode, the image processing block is set in a power down domain, and when the image processing chip operates in the second mode, the image processing block is set in a power up domain.

3. The image processing chip as claimed in claim 1, wherein the interface transmission protocol is the mobile industry processor interface (MIPI) protocol.

4. The image processing chip as claimed in claim 1, wherein the first image end is coupled to an image sensor to receive the at least one first image data packet provided by the image sensor.

5. The image processing chip as claimed in claim 1, the image processing chip operates in the first mode or the second mode according to a control command provided by an application processor.

6. An image processing system, comprising:

an image sensor, outputting at least one first image data packet according to an interface transmission protocol;

an application processor, outputting a control command; and an image processing chip, coupled between the image sensor and the application processor and comprising:

a first image end, coupled to the image sensor to receive the at least one first image data packet;

a second image end, coupled to the application processor;

an image processing block, coupled to the first image end and adapted to convert the at least one first image data packet into at least one second image data packet; and a multiplexer, having a first input end coupled to the first image end, a second input end coupled to the image processing block, and an output end coupled to the second image end, wherein the image processing block comprises:

a receiving interface physical layer, coupled to the first input end and receiving the at least one first image data packet according to the interface transmission protocol;

a receiving interface controller, coupled to the receiving interface physical layer;

a transmitting interface physical layer, coupled to the second input end;

a transmitting interface controller, coupled to the transmitting interface physical layer; and an image processing module, coupled between the receiving interface controller and the transmitting interface controller, wherein when the image processing chip operates in a first mode in response to the control command, the multiplexer is coupled to the first input end and the output end to transmit the at least one first image data packet from the first image end to the second image end through the multiplexer, and when the image processing chip operates in a second mode in response to the control command, the multiplexer is coupled to the second input end and the output end to transmit the at least one second image data packet from the image processing block to the second image end through the multiplexer, wherein when the image processing chip operates in the second mode, the receiving interface controller receives the at least one first image data packet from the receiving interface physical layer and depacketizes the at least one first image data packet to obtain original image data, the image processing module performs image processing on the original image data to generate processed image data, and the transmitting interface controller receives and packetizes the processed image data to generate the at least one second image data packet, such that the transmitting interface physical layer transmits the at least one second image data packet according to the interface transmission protocol.

7. The image processing system as claimed in claim 6, wherein when the image processing chip operates in the first mode, the image processing block is set in a power down domain, and when the image processing chip operates in the second mode, the image processing block is set in a power up domain.

8. The image processing system as claimed in claim 6, wherein the interface transmission protocol is the mobile industry processor interface (MIPI) protocol.

* * * * *